United States Patent [19]

Takahashi et al.

[11] Patent Number: 5,372,463
[45] Date of Patent: Dec. 13, 1994

[54] THROW AWAY INSERT

[75] Inventors: Nobuhiro Takahashi; Shinya Fujisawa; Norihide Kimura, all of Itami, Japan

[73] Assignee: Sumitomo Electric Industries, Ltd., Osaka, Japan

[21] Appl. No.: 51,641

[22] Filed: Apr. 26, 1993

[30] Foreign Application Priority Data

Apr. 27, 1992 [JP] Japan .............. 4-027604[U]

[51] Int. Cl.⁵ .................... B23B 27/22; B23C 5/20
[52] U.S. Cl. ......................... 407/114; 407/115
[58] Field of Search ............ 407/114, 115, 116

[56] References Cited

U.S. PATENT DOCUMENTS

| | | | |
|---|---|---|---|
| 3,792,514 | 2/1974 | Ushijima | 407/115 |
| 3,815,192 | 6/1974 | Ohtsu | 407/115 |
| 4,214,845 | 7/1980 | Mori | 407/114 |
| 4,681,487 | 7/1987 | Petterson | 407/114 |
| 4,969,779 | 11/1990 | Barten | 407/114 |
| 5,044,839 | 9/1991 | Takahashi | 407/114 |
| 5,044,840 | 9/1991 | Fouquer et al. | 407/114 |
| 5,074,720 | 12/1991 | Loqvist et al. | 407/116 |
| 5,076,739 | 12/1991 | Pano | 407/116 |
| 5,082,401 | 1/1992 | Niebauer | 407/114 |
| 5,141,367 | 8/1992 | Beeghly et al. | 407/116 |

FOREIGN PATENT DOCUMENTS 0084612  8/1983  European Pat. Off. .
0418619  3/1991  European Pat. Off. .

*Primary Examiner*—William E. Terrell
*Attorney, Agent, or Firm*—Wenderoth, Lind & Ponack

[57] ABSTRACT

A throw-away insert for low-depth-of-cut finish cutting can be used over a wide range of feed rates. A breaker groove is provided between the center land and each cutting edge. An arcuate small protrusion is formed on the bisector of each nose portion. A narrow groove is formed in the small protrusion. Thin chips, which are produced while the feed rate is low, are curled and broken by the groove formed in the protrusion. Thick chips, which are produced while the feed rate is high, are guided along the grooves and collide with an edge of a side wall of the center land. Thus, thick chips are also smoothly curled and broken by the edge.

5 Claims, 4 Drawing Sheets

THROW AWAY INSERT

BACKGROUND OF THE INVENTION

The present invention relates to a throw-away insert for use as a cutting blade of a cutting tool, especially suited for use in finish cutting.

It is desirable that chips produced during cutting be broken into as small of pieces as possible. Long chips not broken are not only dangerous but may hamper the cutting operation because they are likely to get entangled with the tool or the workpiece.

Chips produced during finish cutting tend to be narrow and thin because during finish cutting, both the depth of cut and the feed rate are low, It is rather difficult to break such chips. Such difficult-to-break chips have been a major obstacle in robotizing or automating cutting operations.

Various chip breakers have been proposed to effectively dispose of chips produced during finish cutting, for example, in Japanese Examined Utility Model Publication 51-19271, a small spherical protrusion is formed on an inclined rake face near each cutting edge to curl chips when they collide with the protrusion.

Another arrangement is proposed in Japanese Examined Utility Model Publication 57-50004 in which a narrow ridge extends from the center land to each nose portion to break chips produced during light cutting.

In order to respond to the increasing demand for high efficiency in a cutting operation, there is a growing tendency to shorten the cutting time by increasing the feed rate even during finish cutting in which the depth of cut is small. In other words, cutting inserts are used more frequently than before under low-depth, high-feed cutting conditions.

Chips produced under such conditions tend to be narrow and thick and thus are difficult to curl. If the breaker protrusions are provided near to the cutting edges, such chips will be curled sharply by colliding with the protrusions. Such sharply curled chips are likely to cause seizure and clogging, thus increasing the cutting resistance and hastening the tool wear.

The higher the feed rate, the higher the chip flow speed and the more unstable the chip flow angle tends to be. However, the above-described simple breaker protrusion cannot control the chip flow direction effectively. Thus, the chip flow angle tends to vary widely, so that the curl diameter cannot be kept constant. This makes it difficult to curl and break chips.

Conventional inserts are provided with small spherical protrusions or trapezoidal ridges to dispose of chips by causing them to collide with these protrusions and ridges. However, since there is a big difference between the collision energy produced when the feed rate is high and that when it is low, even if the depth of the cut is low, the position, shape and height of the breaker protrusions have to be adaptable to either a high-feed condition or low-feed condition. There has been no insert which is adaptable to a wide range of feed rates.

Many conventional inserts for finish work have breaker protrusions applicable to a low depth of cut and low feed rate. We will describe one of such conventional inserts and how chips are disposed of with such an insert, with reference to FIGS. 9–13.

FIG. 9 shows an insert having a small spherical protrusion 3 provided on an inclined rake face near each nose. A thin chip A produced while the feed rate is low collides with the small protrusion and is curled and broken as shown in FIG. 10. However, a thicker chip A, produced when the feed rate is higher, is likely to be curled sharply as shown by the solid line in FIG. 11. If this happens, the flow of the chip will stop or, such a thick chip may slide on the small protrusion 3 and protrude in a random direction without being curled as shown by the chain line in FIG. 11. FIG. 12 shows an insert having a ridge 8 which extends from a center land 2 toward each nose. Chips are curled and broken by the ridge. With this insert, too, chips produced when the feed rate is high tend to flow in the manner shown in FIG. 13. Thus, this insert has the above-described problem, too.

SUMMARY OF THE INVENTION

An object of the present invention is to provide an insert which can dispose of chips within a wide range of feed rates when the depth of cut is low.

In order to achieve the above object, according to the present invention, there is provided a throw-away insert having a cutting edge, a center land, nose portions, a breaker groove formed between the cutting edge and the center land, and arcuate small protrusions provided in the breaker groove on the bisectors of the nose portions of the insert, each of the small protrusions having a narrow groove therein which extends in the direction of the bisector of the each nose portion.

Preferably, the grooves have a width of 0.2–0.8 mm and a depth of 0.02–0.20 mm.

Also, the grooves should extend across the breaker groove so that one end thereof terminates at the corresponding nose tip. This arrangement is effective in disposing of thin chips, which are produced when the feed rate is low.

During finish cutting, wherein the feed rate is low, chips produced flow from the arcuate nose portion toward the center of the insert. Such chips are thin because the feed rate is low. Thus, they ape curled and broken when they collide with the small protrusion or the breaker wall. The narrow groove serves to guide the chips and stabilize the chip flow direction. Also, it serves to deform them to increase their thickness. Thus, the chips are smoothly curled and broken.

When the feed rate is high, chips produced are thick and discharged at a higher speed. The narrow groove serves to restrict the flow direction of such thick chips, so that they will reliably collide with the inclined walls of the center land which are located behind the small protrusion. Thus, their curl diameter is constant and the chips can be disposed of smoothly.

As an alternative to the protrusions, grooved breaker walls extend upwardly and obliquely from surfaces defining the bottom of the breaker groove.

Thus, with the present invention, feed rate can be changed within a wide range during finish cutting, wherein the depth of cut is low, using a single cutting insert.

BRIEF DESCRIPTION OF THE DRAWINGS

Other features and objects of the present invention will become apparent from the following description made with reference to the accompanying drawings, in which:

FIG. 8 is a graph showing the ranges within which chips can be disposed of;

DETAILED DESCRIPTION OF THE PREFERRED EMBODIMENTS

Figure 1:
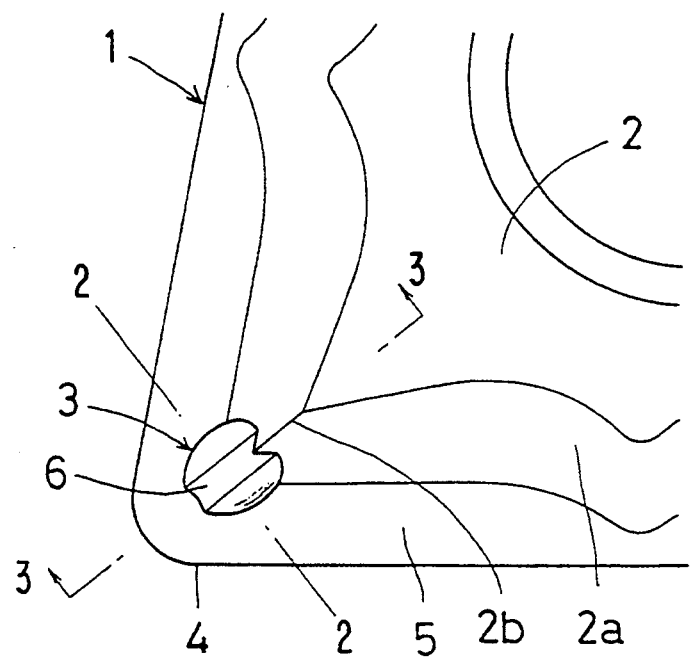
FIG. 1 is an enlarged plan view of a portion of one embodiment of a throw-away insert according to the present invention.

FIG. 1 shows one embodiment of the throw-away insert according to the present invention. A throw-away insert 1 has a center land 2 on the surface thereof. Also, it has a breaker groove 5 and small arcuate protrusions 3 between the center land 2 and a cutting edge 4. Each protrusion 3 is disposed on the bisector of the corresponding nose portion.

The center land 2 has inclined side walls 2a. The adjacent side walls 2a intersect each other along the bisector of the nose portion, thus defining an edge 2b therebetween.

Figure 2:
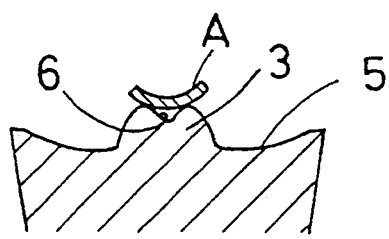
FIG. 2 is a sectional view taken along line 2—2 of FIG. 1, showing how chips are deformed by the narrow groove.
Figure 3:
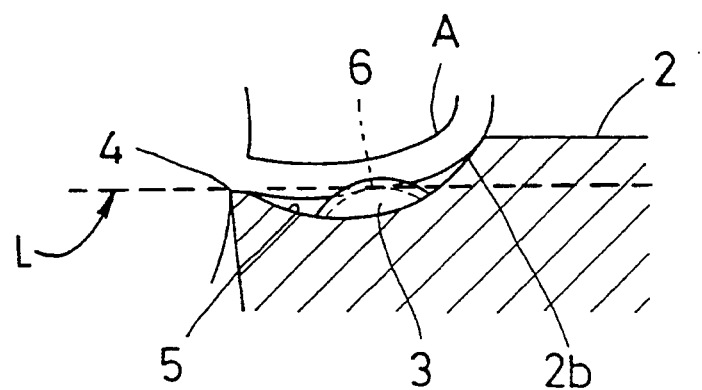
FIG. 3 is a sectional view taken along line 3—3 of FIG. 1, showing how chips are discharged when the feed rate is high.

The small protrusion 3 is elliptical but it may be spherical, The small protrusion 3 is provided with a narrow groove 6 which preferably extends, as viewed from the top of the insert, on the bisector of the nose portion. The groove 6 should have a width of 0.2 to 0.8 mm and a depth of 0.02 to 0.20 mm. The groove 6 serves to stabilize the direction of chip flow and control the curl diameter by deforming chips A passing thereover so that both sides thereof are warped as shown in FIG. 2.

Figure 4:
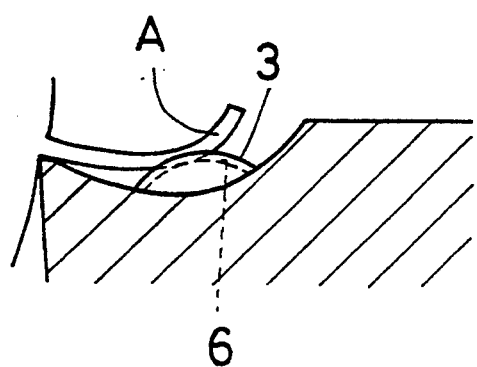
FIG. 4 is a sectional view taken along line 3—3 of FIG. 1, showing how chips are discharged when the feed rate is low.
Figure 5:
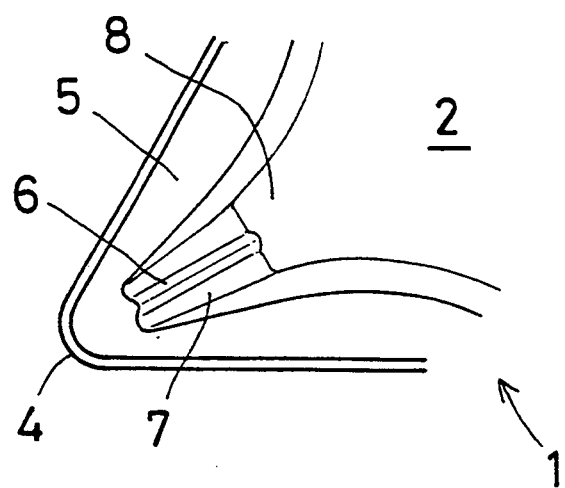
FIG. 5 is an enlarged plan view of a portion of another embodiment.

When the feed rate is high, chips are discharged as shown in FIG. 5. A line "L" tangential to both the cutting edge, at the bisection of the nose portion, and the protrusion 3 at the bottom of the groove 6 intersects the side wall 2a of the center land at edge 2b. Thus, a thick chip A has its flow direction controlled by the groove 6 formed in the surface of the small protrusion 3 and collides, without fail, with the edge 2b. Then it is pushed up along the edge 2b and curled. At this time, the chip is subjected to a force that tends to bend or warp it in a direction opposite to the direction of warp shown in FIG. 2. Due to this force, very complicated stains are produced in the chip so that it is broken very smoothly. When the feed rate is low, a thin chip is curled and broken when it collides with the small protrusion 3 as shown in FIG. 4.

Figure 8:
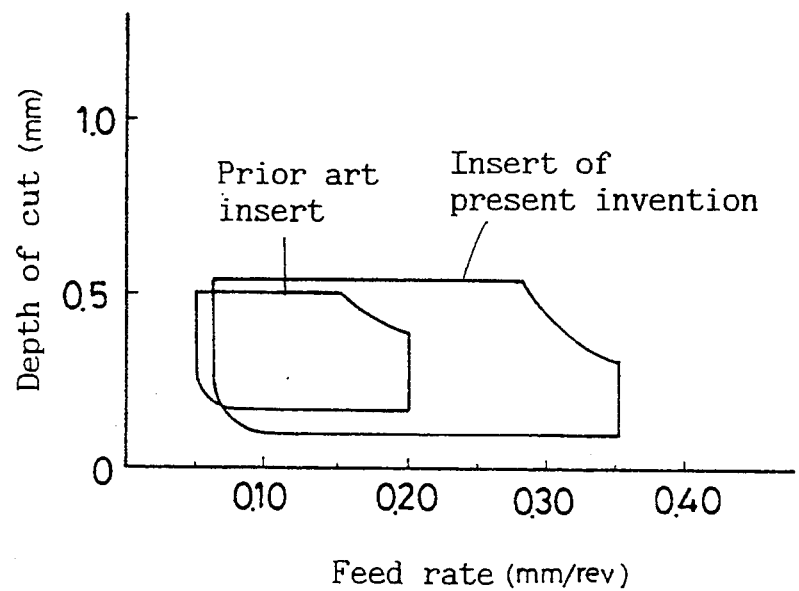
Figure 9:
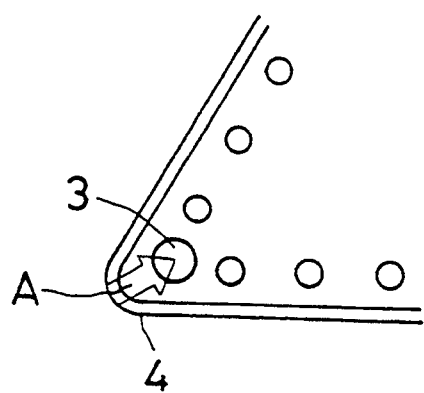
FIG. 9 is a plan view of a portion of a conventional insert.
Figure 10:
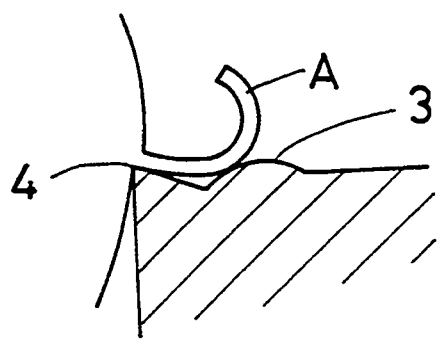
FIG. 10 is a sectional view of the conventional insert of FIG. 9, showing how chips are disposed of when the feed rate is low.
Figure 11:
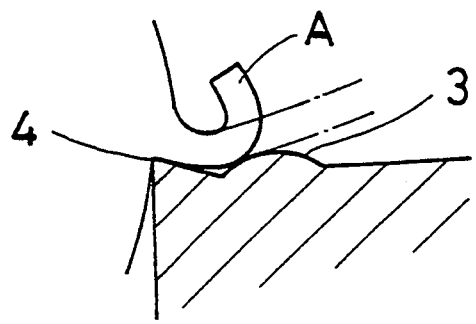
FIG. 11 is a similar view, showing how chips are disposed of when the feed rate is high.
Figure 12:
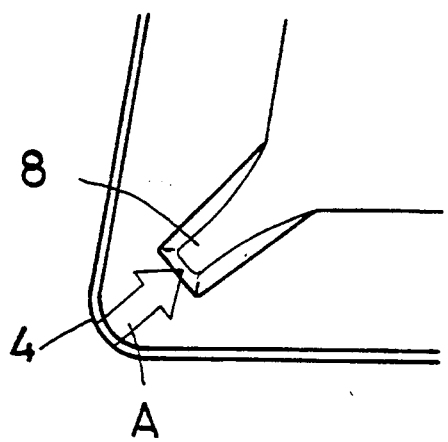
FIG. 12 is a plan view of a portion of another conventional insert.
Figure 13:
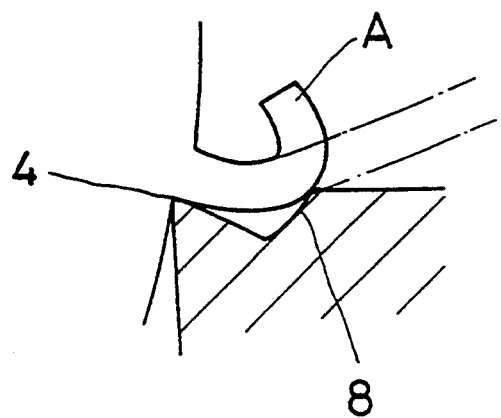
FIG. 13 is a sectional view of the conventional insert of FIG. 12, showing how chips are disposed of when the feed rate is high.

FIG. 8 shows ranges within which the insert shown in FIG. 1 and the insert shown in FIG. 9 can dispose of chips when tested under the following conditions.

(Test conditions)

Workpiece: SCR420

Inserts used: CNMG120408 (the insert of the invention has small protrusions each formed with a groove 0.4 mm wide and 0.05 mm deep)

Cutting conditions: V=180 m/min, depth of cut=0-.1–0.5 mm, feed rate=0.05–0.35 mm/rev.

FIG. 8 clearly shows that the insert of the present invention is especially effecting when the depth of cut is low and the feed rate is high.

Figure 6:
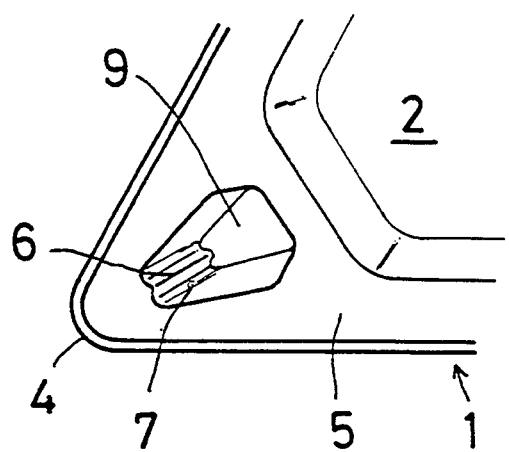
FIG. 6 is an enlarged plan view of a portion of still another embodiment.

FIGS. 5 and 6 show another embodiment of the present invention. In this embodiment, the small protrusion is replaced with a breaker wall 7 which rises obliquely rearwardly from the breaker groove 5 in a straight line. A groove 6 is formed in the breaker wall. The groove has a uniform width over the entire length thereof.

As shown in FIG. 5, the breaker groove 7 may be provided in the tip of the center land 2 protruding toward the nose. As shown in FIG. 6, it may be provided in the tip of a small land 9 provided, separately from the center land 2, between the center land 2 and each nose portion. In either case, chips are guided a longer distance by the groove 6 than by the groove 6 formed in the spherical protrusion 3. This arrangement is advantageous when the depth of cut is extremely low (0.05–0.3 mm).

Figure 7:
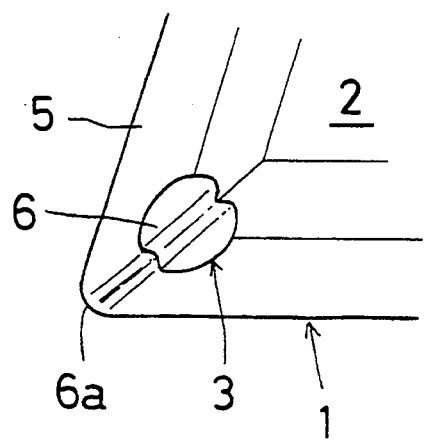
FIG. 7 is an enlarged plan view of a variant of the embodiment of FIG. 1.

FIG. 7 shows an alternative embodiment of the insert shown in FIG. 1. In this embodiment, the groove 6 extends across the breaker groove 5 so that its one end 6a is disposed at the tip of the nose. With this arrangement, thin chips produced when the feed rate is low can be disposed of more smoothly. This is because the thickness of chips produced at the nose portion increases while being guided along the narrow groove 6 formed in the breaker groove 5. The chips having an increased thickness collide stably with the small protrusion 3. Similarly, the grooves 6 shown in FIGS. 5 and 6 may be extended to the tip of the nose to achieve the same effect.

What is claimed is:

1. A throw-away insert comprising: nose portions defining corners of the insert, respectively, a center land including an upper surface and a side wall extending downwardly from the periphery of said upper surface, a cutting edge extending at the periphery of the insert, a breaker groove located between said cutting edge and said center land, arcuate protrusions located in said breaker groove along lines bisecting said corners of the insert, respectively, and a groove in each respective said protrusion extending longitudinally in a plane projected from the line bisecting the respective corner of the insert at which the protrusion is located, a line tangential to both the cutting edge, at the bisection of the respective corner of the insert, and the respective protrusion at the bottom of the groove therein intersecting the side wall of said center land, whereby the groove will guide a chip of a workpiece under a given feed rate and depth of cut into contact with the side wall of the center land.

2. A throw-away insert as claimed in claim 1, wherein the groove extend to and terminate at tips of said nose portions, respectively.

3. A throw-away insert comprising: nose portions defining corners of the insert, respectively, a central upper surface, a cutting edge extending at the periphery of the insert, a breaker groove located between said cutting edge and said central upper surface, and breaker walls extending upwardly and obliquely from a surface defining the bottom of said breaker groove in a direction toward said central upper surface, said breaker walls being located along lines bisecting said corners of the insert, respectively, and a groove extending longitudinally in each respective said breaker wall in a plane projected from the line bisecting the corner of the insert and along which line the respective breaker wall is located, said groove also extending longitudinally in the breaker wall upwardly and obliquely from the surface defining the bottom of said breaker groove toward said central upper surface, and each of the grooves having a uniform width over the entire length thereof.

4. A throw-away insert as claimed in claim 3, wherein the breaker walls terminate at said upper central surface of the insert.

5. A throw-away insert as claimed in claim 3, wherein the grooves also have portions extending to and terminating at tips of said nose portions, respectively.

* * * * *